US010715627B1

United States Patent
Combs et al.

(10) Patent No.: US 10,715,627 B1
(45) Date of Patent: *Jul. 14, 2020

(54) METHODS AND SYSTEMS FOR SMART RESOURCE ALLOCATION BASED ON WORK LOCATION PREDICTIONS

(71) Applicant: UIPCO, LLC, San Antonio, TX (US)

(72) Inventors: Cynthia Combs, San Antonio, TX (US); Ruthie Lyle, Durham, NC (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,864

(22) Filed: Jun. 13, 2019

Related U.S. Application Data (63) Continuation of application No. 15/697,604, filed on Sep. 7, 2017, now Pat. No. 10,367,911.

(60) Provisional application No. 62/397,400, filed on Sep. 21, 2016.

(51) Int. Cl.
| | |
|---|---|
| H04L 29/06 | (2006.01) |
| H04L 29/08 | (2006.01) |
| H04W 4/02 | (2018.01) |
| G01C 21/36 | (2006.01) |
| G06F 21/31 | (2013.01) |
| G06F 16/9535 | (2019.01) |
| G06F 9/50 | (2006.01) |
| G06F 16/9537 | (2019.01) |
| H04Q 3/00 | (2006.01) |

(52) U.S. Cl.
CPC ........ H04L 67/306 (2013.01); G01C 21/3617 (2013.01); G06F 9/5011 (2013.01); G06F 16/9535 (2019.01); G06F 16/9537 (2019.01); G06F 21/31 (2013.01); H04Q 3/0066 (2013.01); H04W 4/025 (2013.01)

(58) Field of Classification Search
CPC .................................................... H04L 67/306
See application file for complete search history.

(56) References Cited

U.S. PATENT DOCUMENTS

| | | | | |
|---|---|---|---|---|
| 6,047,327 A | * | 4/2000 | Tso ...................... | G06F 16/9537 709/232 |
| 6,650,902 B1 | * | 11/2003 | Richton ................ | H04W 4/029 455/456.3 |
| 9,392,416 B2 | * | 7/2016 | Sridhar .............. | G01C 21/3679 |

(Continued)

OTHER PUBLICATIONS

U.S. Appl. No. 15/697,604, filed Sep. 7, 2017, Methods and Systems for Smart Resource Allocation Based on Work Location Predictions.

(Continued)

*Primary Examiner* — Adnan M Mirza
(74) *Attorney, Agent, or Firm* — Perkins Coie LLP (57) ABSTRACT

Embodiments disclosed herein describe a method and system that create a user profile associated with a user. The user profile can include locations in which the user has worked and information relating to one or more devices associated with the user. The system can receive data from the devices and analyze the data to predict a work location of the user. Resources can be optimized based on the predicted work location of the user and the predicted work locations of other users.

20 Claims, 5 Drawing Sheets

(56) References Cited

U.S. PATENT DOCUMENTS

2016/0366551 A1* 12/2016 Alsina .................. H04W 4/021

OTHER PUBLICATIONS

U.S. Appl. No. 62/397,400, filed Sep. 21, 2016, Methods and Systems for Smart Resource Allocation Based on Work Location Predictions.

* cited by examiner

METHODS AND SYSTEMS FOR SMART RESOURCE ALLOCATION BASED ON WORK LOCATION PREDICTIONS

CROSS-REFERENCE TO RELATED APPLICATIONS

This application is a continuation of U.S. patent application Ser. No. 15/697,604, entitled "METHODS AND SYSTEMS FOR SMART RESOURCE ALLOCATION BASED ON WORK LOCATION PREDICTIONS", filed on Sep. 7, 2017, now allowed; which is a non-provisional of and claims priority to U.S. Provisional Application No. 62/397,400, filed on Sep. 21, 2016, entitled "METHODS AND SYSTEMS FOR SMART RESOURCE ALLOCATION BASED ON WORK LOCATION PREDICTIONS," which is hereby incorporated by reference in its entirety for all purposes.

TECHNICAL FIELD

Various embodiments of the present disclosure generally relate to resource allocation. More specifically, various embodiments of the present disclosure relate to smart resource allocation based on work location predictions.

BRIEF DESCRIPTION OF THE DRAWINGS

Embodiments of the present disclosure will be described and explained through the use of the accompanying drawings, in which.

DETAILED DESCRIPTION

Companies strive to attract and retain top talent. Therefore, many companies provide services or perks that will help their employees or contractors, such as on-site daycare, nap time, a relaxed dress code, and a choice of work location (i.e., the physical location where the user performs work, e.g., at an office building associated with an employer, at an office building unrelated to the employer, at home, at a coffee shop). In particular, more and more companies are providing the ability for employees to work remotely in jobs where working remotely is feasible (e.g., jobs that are performed primarily on a computer and/or phone such as a computer programmer). Rather than sitting at a desk in a typical workplace environment (e.g., a desk or cubicle at an office building of the employer), many employees prefer to perform their duties in alternative work locations at least some of the time (e.g., home, coffee shop, airplane, alternative facility, alternative desk at typical facility). Such locational preferences can have a significant impact on resources, warranting an adjustment of resources. For example, on days when more than 15% of employees are predicted to work in a place other than an enterprise location, fewer resources at the enterprise location may be needed. For example, fewer cafeteria staff members, office services, or daycare providers may be needed. In another example, if an excess of employees or contractors are planning to work at a particular enterprise location, then some employees or contractors could be directed to other locations.

Today, no systematic methods exist to dynamically infer or predict an employee's choice of work location. Thus, embodiments described herein provide methods and systems to obtain and analyze employee behavior data to determine where an employee or contractor will work and to optimize resources accordingly.

An employee's (or other user's) location can be detected using information gathered from one or more devices associated with the employee. Types of information include device-related ambient network information, GPS information, cell phone triangulation information, traffic, weather conditions, video footage, environment sounds, route information, destination information, and vehicle telematics. The user's personal and/or work calendar may be used in determining a predicted work location. The system can analyze the information to determine or predict where the employee will be working by comparing the location information with previously collected location information and/or anticipated location information determined from human resources scheduling systems (which systems can be integrated with or separate from the enterprise scheduling platform) and the user's work schedule. Resources can be optimized based on the predicted work location of the user and predicted work locations of other users as patterns of aggregated employee characteristics and work environments are determined.

Optimizing resources can include adjusting network bandwidth, staffing (e.g., janitorial staff), parking spots, and office temperature at an enterprise location. The system can ensure that the user has access to the predicted work location. Moreover, if the system predicts that the employee will be traveling mid-day to a second location, the employee's security token can be updated to allow access to the second location, or access at the second location can be updated to permit the user access with the user's current security token. Additionally, the user's computer can be started when the system determines that the user is approaching the work premises. In some embodiments, the system detects that information should be provided to the employee. For example, if a camera and software monitoring parking determines that there is no parking close to the employee's building, then a text or other communication can be sent to the user to park in a different lot or in a particular spot, to work at a secondary enterprise location, or to work from home.

In some embodiments, the location information can be received from a device communicably coupled to or integrated with a vehicle. In addition to location information, the information sent from the device can include the status of the user's vehicle (e.g., idle, moving, off). Integration with the vehicle can be additionally realized virtually and subsequently passed to another vehicle by leveraging software and telematics.

This disclosure describes authentication systems and methods designed to increase the efficiency of organizations by predicting or inferring a user's choice of work location and optimizing resources accordingly. Various embodiments may provide one or more of the following technological improvements: (1) improved resource allocation based on aggregated and individual predicted work locations, (2) methods and systems for predicting a user's work location, (3) an increased level of security by providing location-based security access based on location predictions, and (4) an enterprise scheduling system with real-time personalized information for each user.

In the following description, numerous specific details are set forth to provide a thorough understanding of embodiments of the present disclosure. However, it will be apparent to one skilled in the art, upon reading the disclosure, that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical discs, read-only memories (ROMs), random-access memories (RAMs), erasable programmable read-only memories (EPROMs), electrically erasable programmable read-only memories (EEPROMs), magnetic or optical cards, flash memory, or other types of machine-readable media suitable for storing electronic instructions.

Figure 1:
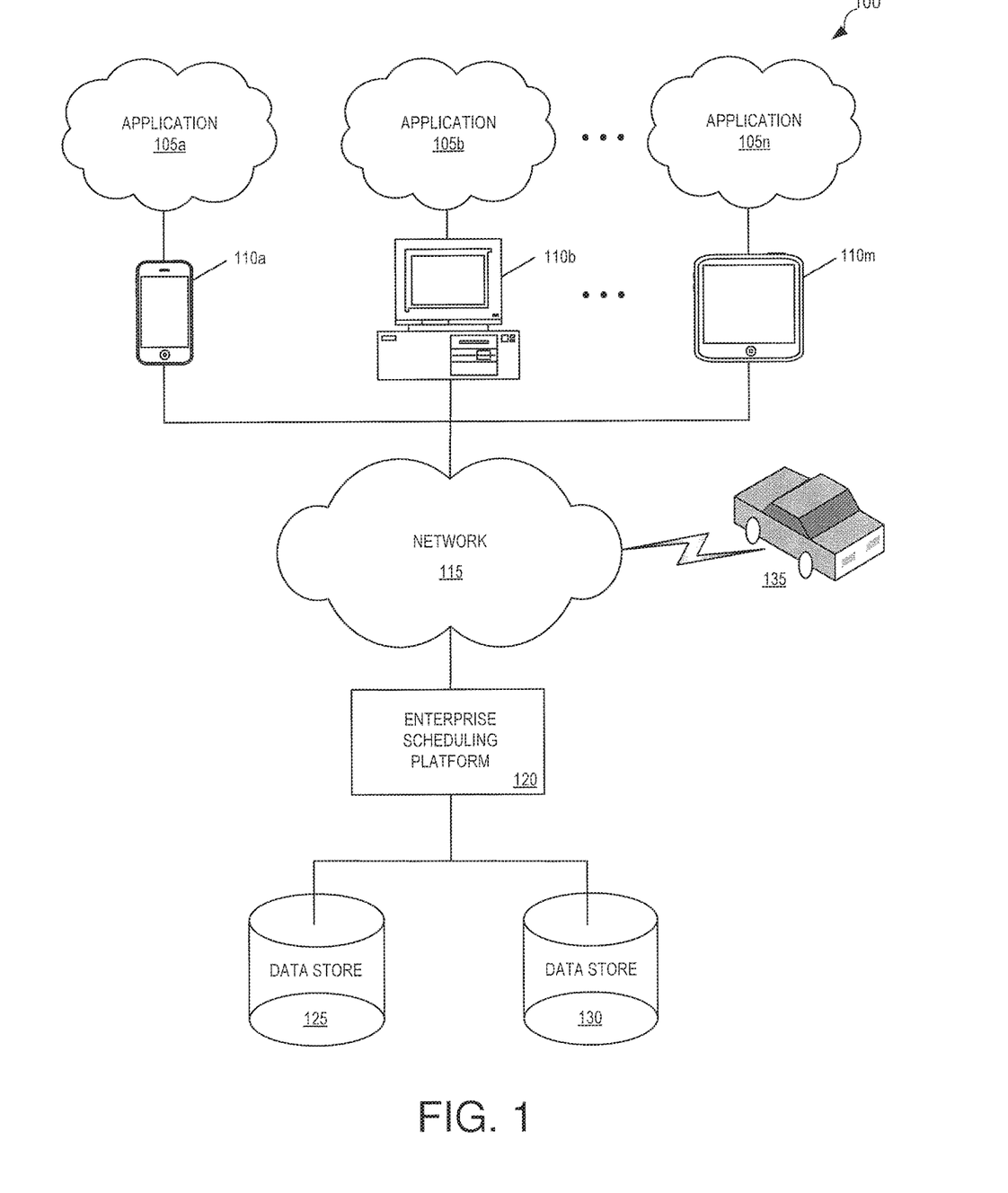
FIG. 1 illustrates an example of a network-based operating environment in accordance with various embodiments of the present disclosure.

FIG. 1 illustrates an example of a network-based operating environment 100 in which some embodiments of the present disclosure may be used. As illustrated in FIG. 1, operating environment 100 may include applications 105a-105n running on one or more computing devices 110a-110m (such as a mobile device; a mobile phone; a telephone; a tablet computer; a mobile media device; a mobile gaming device; a vehicle-based computer; a dedicated terminal; a public terminal, desktop, or laptop computer; a kiosk; a wearable device such as a smartwatch; vehicles etc.). In some embodiments, applications 105a-105n may be stored on one or more computing devices 110a-110m or may be stored remotely on a server (in the "cloud"). These computing devices can include mechanisms for receiving and sending traffic by connecting through network 115 to vehicle 135, enterprise scheduling platform 120, and data stores 125 and 130.

Computing devices 110a-110m may be configured to communicate via network 115 with enterprise scheduling platform 120. In some embodiments, computing devices 110a-110m can retrieve or submit information to enterprise scheduling platform 120 and run one or more applications with customized content retrieved by enterprise scheduling platform 120 and data stores 125 and 130. For example, computing devices 110a-110m can execute a browser application or a customized client to enable interaction between the computing devices 110a-110m, enterprise scheduling platform 120, and data stores 125 and 130.

Network 115 can be any combination of local area and/or wide area networks using wired and/or wireless communication systems. Network 115 can be, or could use, any one or more of the following protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), user datagram protocol (UDP), hypertext transport protocol (HTTP), simple mail transfer protocol (SMTP), and file transfer protocol (FTP). Data exchanged over network 115 may be represented using technologies, languages, and/or formats, including hypertext markup language (HTML) or extensible markup language (XML). In addition, all or some links can be encrypted using conventional encryption technologies, such as secure sockets layer (SSL), transport layer security (TLS), and Internet protocol security (IPSec).

Enterprise scheduling platform 120 can run on one or more servers and can be used to receive location information, network information, weather, traffic conditions, vehicle location, vehicle status (e.g., idle, moving), and destination; store historical and current work schedules; determine work location predictions; optimize resources; store profiles and/or policies in data stores 125 and 130; and/or perform other activities. In some embodiments, enterprise scheduling platform 120 includes various data processing and analytic tools that allow it to take actions to adjust resources (e.g., alter temperatures in the office, send messages to reduce or increase staffing, update security policies). In some embodiments, enterprise scheduling platform 120 is a server.

Enterprise scheduling platform 120 may be communicably coupled with vehicle 135, data stores 125 and 130, and computing devices 110a-110m, and may communicate, access, or receive data (e.g., device information, authentication information) from vehicle 135, computing devices 110a-110m, and data stores 125 and 130. Enterprise scheduling platform 120 may be associated with an organization and the users may be employees.

Enterprise scheduling platform 120 may be customized or calibrated by individual companies or service providers based on user needs and/or business objectives. For example, companies may have different business rules and/or contact options for providing assistance to a user.

Data stores 125 and 130 can be used to manage storage and access to user data such as user profiles, work locations, work schedules, registered devices, and other information. Data stores 125 and 130 may be data repositories of a set of integrated objects that are modeled using classes defined in database schemas. Data stores 125 and 130 may further include flat files that can store data. Enterprise scheduling platform 120 and/or other servers may collect and/or access data from data stores 125 and 130.

Vehicle 135 may be any type of vehicle that communicates with enterprise scheduling platform 120. Vehicle 135 may directly communicate with enterprise scheduling platform 120, or vehicle 135 can have a device communicably coupled or integrated that communicates with enterprise scheduling platform 120. For example, vehicle 135 can have a vehicle telematics system that is able to connect to enterprise scheduling platform 120 to provide state information about the vehicle (e.g., moving, off, idling, route).

Figure 2:
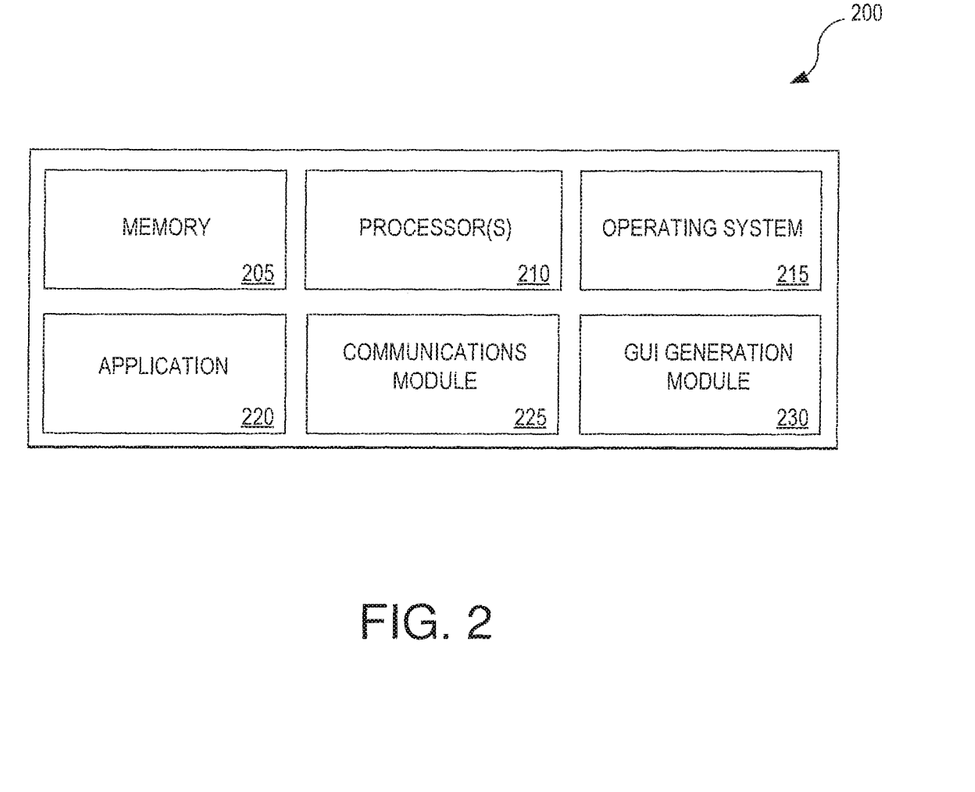
FIG. 2 illustrates various components of a computing device that may be used in accordance with one or more embodiments of the present disclosure.

FIG. 2 illustrates a set of components 200 within computing device 110 according to one or more embodiments of the present disclosure. According to the embodiments shown in FIG. 2, computing device 110 can include memory 205, one or more processors 210, operating system 215, application 220, communications module 225, and graphical user interface (GUI) generation module 230. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module. For example, in one embodiment, application 220 and communications module 225 can be combined into a single component.

Memory 205 can be any device, mechanism, or populated data structure used for storing information. In accordance with some embodiments of the present disclosure, memory 205 can encompass, but is not limited to, any type of volatile memory, nonvolatile memory, or dynamic memory. For example, memory 205 can be random-access memory (RAM), memory storage devices, optical memory devices, magnetic media, floppy disks, magnetic tapes, hard drives, single inline memory modules (SIMMs), synchronous dynamic random-access memory (SDRAM), dual inline memory modules (DIMMs), Rambus dynamic random-access memory (RDRAM), double data rate random-access memory (DDR RAM), small outline dual inline memory modules (SODIMMs), EPROM, EEPROM, compact discs, digital versatile discs (DVDs), and/or the like. In accordance with some embodiments, memory 205 may include one or more disk drives or flash drives; one or more databases; one or more tables; or one or more files, local cache memories, processor cache memories, relational databases, flat databases; and/or the like. In addition, those of ordinary skill in the art will appreciate many additional devices and techniques for storing information that can be used as memory 205.

Memory 205 may be used to store instructions for running one or more applications or modules on processor(s) 210. For example, memory 205 could be used in one or more embodiments to house all or some of the instructions needed to execute the functionality of operating system 215, application 220, communications module 225, and GUI generation module 230.

Operating system 215 can provide a software package that is capable of managing the hardware resources of computing device 110. Operating system 215 can also provide common services for software applications running on processor(s) 210. In accordance with various embodiments, operating system 215 can coordinate resources for multiple applications 220 that allow a user to access and interact with enterprise scheduling platform 120. For example, application 220 can include an application that provides navigational services, financial services, social networking services, or gaming services.

Application 220 can access a server and/or a platform associated with an organization (e.g., enterprise scheduling platform 120) to collect information from a user or an environment. Such information can include traffic conditions, navigational information (e.g., route, destination, current location), and mood or health information of the user (e.g., user temperature, heart rate). In some embodiments, application 220 can receive information relating to resource optimization such as, "The parking lot near your building is full; we recommend you work at the alternative facility today," or "Your 8:30 meeting will be delayed due to the accident on US-285." In some embodiments, application 220 can receive a special security token if the user is located or predicted to work at a facility other than where the user typically works.

Communications module 225 can communicate with another device (e.g., vehicle 135) and/or a server (e.g., enterprise scheduling platform 120). For example, communications module 225 can send and receive information collected by application 220. In some embodiments, communications module 225 can use GPS or cell phone triangulation to determine a location. In some embodiments, communications module 225 can detect ambient networks (e.g., Bluetooth, Wi-Fi) and send the characteristics of the networks to enterprise scheduling platform 120.

GUI generation module 230 can generate one or more GUI screens that allow for interaction with a user. In at least one embodiment, GUI generation module 230 generates a graphical user interface receiving and/or conveying information to the user. For example, the GUI generation module 230 can display information received from enterprise scheduling platform 120 (e.g., messages regarding meetings, requests for feedback). In some embodiments, GUI generation module 230 can display a user interface requesting a user satisfaction level with a suggestion provided by enterprise scheduling platform 120 (e.g., is the user relieved when it is suggested that the user stay home?).

Figure 3:
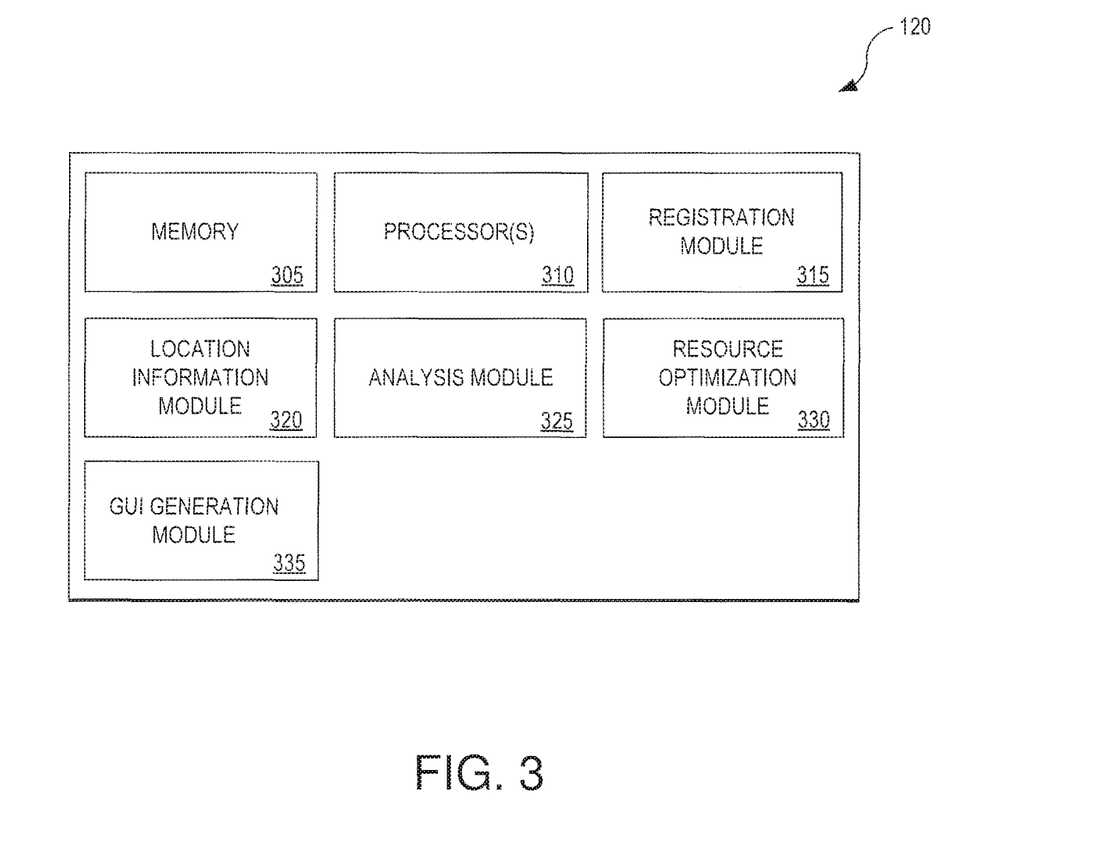
FIG. 3 illustrates various components of an enterprise scheduling platform that may be used in accordance with various embodiments of the present disclosure.

FIG. 3 illustrates a set of components within enterprise scheduling platform 120 according to one or more embodiments of the present disclosure. According to the embodiments shown in FIG. 3, enterprise scheduling platform 120 can include memory 305, one or more processors 310, registration module 315, location information module 320, analysis module 325, resource optimization module 330, and GUI generation module 335. Other embodiments of the present disclosure may include some, all, or none of these modules and components, along with other modules, applications, and/or components. Still yet, some embodiments may incorporate two or more of these modules and components into a single module and/or associate a portion of the functionality of one or more of these modules with a different module.

Memory 305 can be any device, mechanism, or populated data structure used for storing information as described above for memory 205. Memory 305 may be used to store instructions for running one or more applications or modules on processor(s) 310. For example, memory 305 could be used in one or more embodiments to house all or some of the instructions needed to execute the functionality of registration module 315, location information module 320, analysis module 325, resource optimization module 330, and GUI generation module 335.

Registration module 315 can register one or more devices with a user profile. The device can be, for example, a wearable device, mobile phone, laptop, tablet, a vehicle, or a device connected to a vehicle.

Location information module 320 can poll, collect, or receive information from the registered devices that can indicate location. Such information can include network information (e.g., networks the device is connected to, sensed networks), weather conditions, traffic conditions, environment noise, vibrations, video footage, coordinates, GPS information, and cell phone triangulation information. Location information module 320 can provide the location information to analysis module 325. In some embodiments, location information module 320 can receive an input from the user specifying where the user is located.

Analysis module 325 receives location information from location information module 320 and determines a predicted work location and an actual/destination location of where the user will be or is working. User work location patterns can be detected as data is gathered over time. The predicted work location can be determined by reviewing the user's previous work location history and work schedule. For example, if the user typically works at home when the user's mobile device is connected to a home network at 8:30 a.m., analysis module 325 can predict that the user will work at home when the user's mobile device is connected to a home network after 8:30 a.m. Additional information may further provide information as to where the user likely will work for the day such as calendar information (e.g., the user is likely working at an enterprise location when the user is scheduled to give a tour of a facility, the user is likely working from home when the user has a doctor's appointment). In some embodiments, the user can input into the device where the user intends to work.

In some embodiments, analysis module 325 can use vehicle telematics to predict whether a user is intending to work in the office or at an alternative work location. The connected vehicle can be connected to a work scheduling system and, based on the location and regular commute time of the employee, the work scheduling system can query the car to determine its location, destination, and status (e.g. in motion, not in motion, engine idling or not idling, etc.). Additional or other devices associated with the user can provide real-time GPS information to determine the user's dynamic route information. Based on the analysis of this information, analysis module 325 can predict or determine a work location.

The user's actual work location can be determined in various ways. Factors such as the location of the user's device when the user has been logged into the organization's system/network for a period of time, stationary location of user's device for a period of time, charging status of computing device (e.g., is enterprise device plugged in, vehicle status). For example, if the user has been logged onto the organization's computer system/network from 8:30 a.m. until 9:00 a.m. and the user's device does not substantially change location within that period of time, the device location can be considered the user's actual work location for the day, morning, or other period of time.

Analysis module 325 can further receive sensor information from a wearable device that helps determine whether the user is satisfied with a suggestion or message from resource optimization module 330. For example, when resource optimization module 330 suggests that the user stay home due to weather, traffic, parking, office conditions or other reasons, a wearable device can send information such as body temperature, perspiration and heart rate to analysis module 325 to determine a satisfaction level of the user. In some embodiments, the user can be asked to provide feedback (e.g., emoji) indicating a satisfaction level of the user with the employer.

Resource optimization module 330 can receive from analysis module 325 a predicted or actual location of where the user and other users will be or are working and can apply business rules to optimize operations and resources. For example, when the parking lot is full and the user is farther than a certain distance from work, resource optimization module 330 can send a message to the user informing the user of the situation and advise the user to work in a different location. As a further example, when more than a certain percentage of workers will be or are working outside of the office, office temperature, support staff, and network bandwidth may be changed to more optimally fit the number of workers predicted to be in the building. In a further example, when a user is expected to physically come to an enterprise location to work and the user is detected to be close to the building, the user's computer can be turned on to allow any relevant applications or other startup procedures to occur before the user arrives. In some embodiments, the user's security token or other access can be changed by resource optimization module 330 when analysis module 325 predicts that the user will be working at an alternative location. Moreover, resource optimization module 330 can automatically update the user's settings (e.g., an instant message notice) to reflect that the user is working in an alternative location.

In some embodiments, when analysis module 325 detects patterns of user work locations, resource optimization module 330 can provide recommendations for efficient work spaces. For example, when analysis module 325 detects that ten users within a five-mile radius work from home on similar days of the week, resource optimization module 330 can recommend a small worksite location within the five-mile radius for the users, should the users want to go into an office close to their homes. Optimization module 330 can also recommend networking opportunities such as arranging a teaming event for dispersed employees (e.g., lunch). Optimization module 330 can also provide information to on premise resources to provide awareness of smaller worksite locations close that may be convenient for an on premise employee to use for the purposes of a meeting (e.g., an executive or manager could arrange a face to face meeting with a team at a smaller worksite location that is more convenient for the employees).

GUI generation module 335 is capable of generating one or more GUI screens that allow interaction with a user. In at least one embodiment, GUI generation module 335 generates a graphical user interface receiving information from and/or conveying information to the user. For example, GUI generation module 335 can display a dashboard to assist with resource planning.

Figure 4:
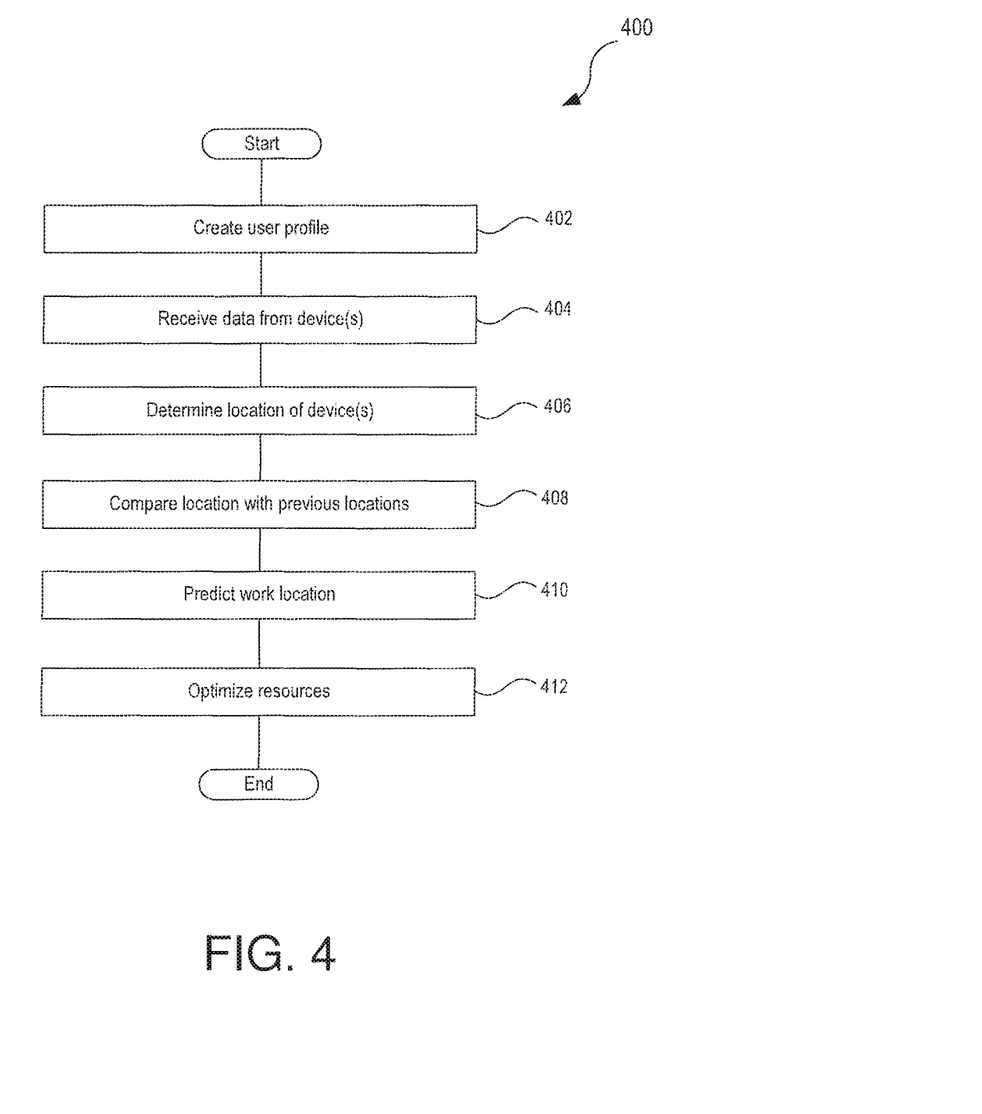
FIG. 4 is a flowchart illustrating a set of operations for providing assistance to a user via an enterprise scheduling platform in accordance with various embodiments of the present disclosure.

FIG. 4 is a flowchart illustrating a set of operations 400 for assisting a user using a conversational virtual assistant. In some embodiments, fewer than all of the operations in each set of operations are performed, whereas, in other embodiments, additional operations are performed. Moreover, in some embodiments, the operations may be performed in different orders or in parallel. The operations can be performed by components 200 of computing device 110 illustrated in FIG. 2, by vehicle 135, and/or by various components of enterprise scheduling platform 120 illustrated in FIG. 3.

Creating operation 402 creates a user profile, including information about devices associated with the user. In some embodiments, the user can provide a preference of sharing location information or information that can be used to determine the user's location. Receiving operation 404 receives data from a device, including data that can be used to determine a current location of the user (e.g., GPS information, ambient network information, noise information). Determining operation 406 determines a current location of the user. Comparing operation 408 compares the current location of the user with previous locations. Predicting operation 410 predicts where the user plans to work based on the current information and the historical information. Such predictions can be made for others, as well. Optimizing operation 412 optimizes resources based on the predicted work location of the user and other users.

Computer System Overview

Figure 5:
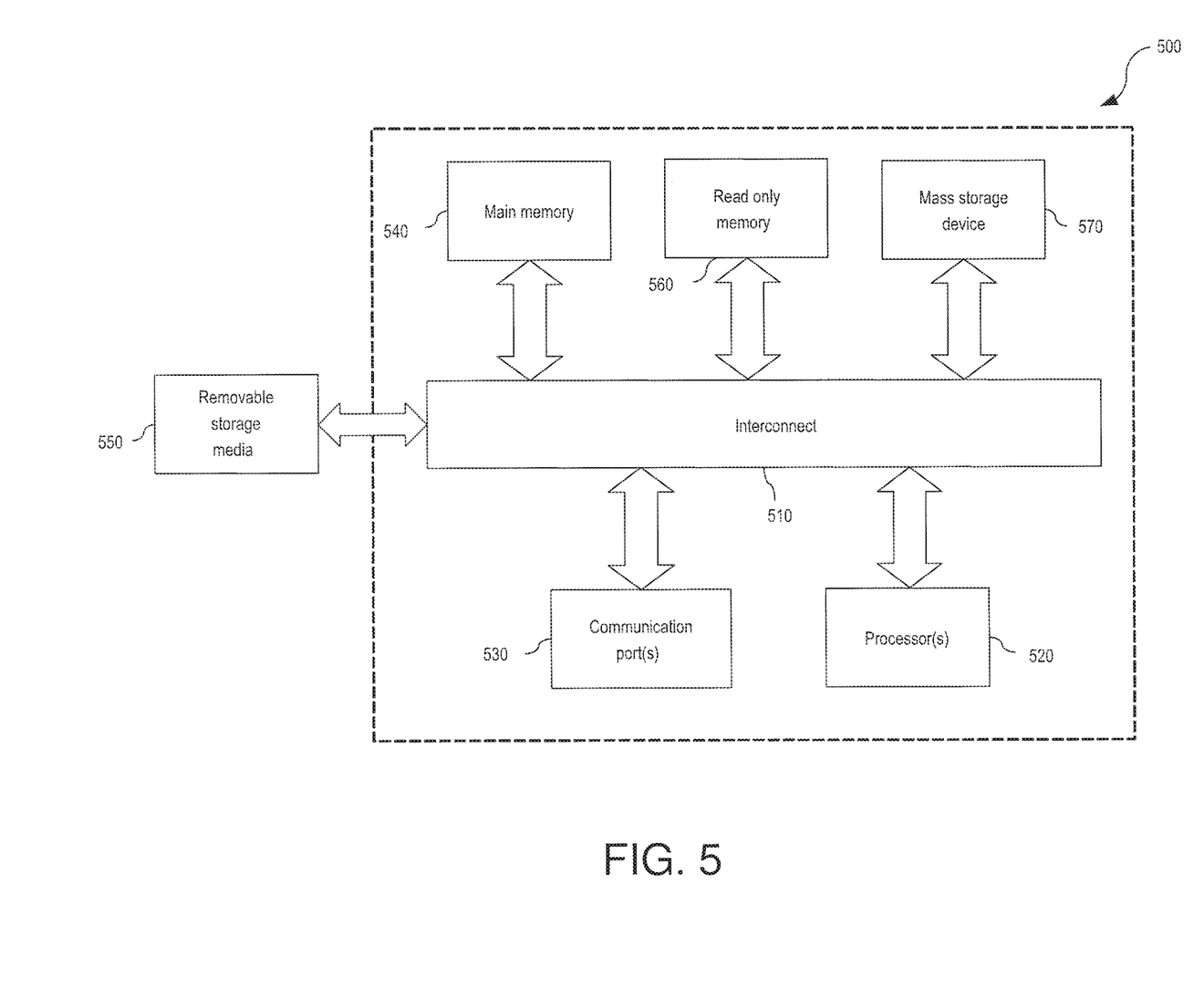
FIG. 5 illustrates an example of a computer system with which some embodiments of the present disclosure may be used.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 5 is an example of a computer system 500 with which embodiments of the present disclosure may be utilized. According to the present example, the computer system 500 includes an interconnect 510, at least one processor 520, at least one communication port 530, a main memory 540, a removable storage media 550, a read-only memory 560, and a mass storage device 570.

Processor(s) 520 can be any known processor, such as, but not limited to, an Intel® Itanium® or Itanium 2® processor(s), or AMD® Opteron® or Athlon MP® processor(s), or Motorola® lines of processors. Communication port(s) 530 can be a RS-232 port for use with a modem-based dial-up connection, a 10/100 Ethernet port, or a Gigabit port using copper or fiber. Communication port(s) 530 may be chosen depending on the type of network, such as a Local Area Network (LAN), Wide Area Network (WAN), or any network to which the computer system 500 connects.

Main memory 540 can be RAM or any other dynamic storage device(s) commonly known in the art. Read-only memory 560 can be any static storage device(s) such as programmable read-only memory (PROM) chips for storing static information, such as instructions for processor(s) 520.

Mass storage device 570 can be used to store information and instructions. Mass storage devices that may be used include hard disks such as the Adaptec® family of small computer system interface (SCSI) drives, optical discs, or an array of discs such as redundant array of independent disks (RAID), the Adaptec® family of RAID drives, or any other mass storage device.

Interconnect 510 communicatively couples processor(s) 520 with the other memory, storage, and communication blocks. Depending on the storage devices used, interconnect 510 can be a PCI/PCI-X- or SCSI-based system bus.

Removable storage media 550 can be any type of external hard drive, floppy drive, IOMEGA® Zip Drives, CD-ROM, compact disc re-writable (CD-RW), and/or digital video disc read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which a connection or a coupling exists in accordance with the aforementioned definition.

The phrases "in some embodiments," "according to some embodiments," "in the embodiments shown," "in other embodiments," "embodiments," and the like, generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" encompasses being completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules; or a module can include one or more application programs.

The term "network" generally refers to a group of interconnected devices capable of exchanging information. A network may be as small as several personal computers on a LAN or as large as the Internet, a worldwide network of computers. As used herein, "network" is intended to encompass any network capable of transmitting information from one entity to another. In some cases, a network may comprise multiple networks—even multiple heterogeneous networks—such as one or more border networks, voice networks, broadband networks, financial networks, service provider networks, Internet service provider (ISP) networks, and/or public switched telephone networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. More importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead, are meant to be examples. Other systems, devices, and networks to which embodiments of the present disclosure are applicable include, but are not limited to, other types of communication and computer devices and systems. More specifically, embodiments are applicable to communication systems, services, and devices, such as cell phone networks and compatible devices. In addition, embodiments are applicable to all levels of computing, from the personal computer to large network mainframes and servers.

In conclusion, the present disclosure discloses novel systems, methods, and arrangements for predicting one's work location and adjusting resources. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments that have different combinations of features, and embodiments that do not include all of the described features. Accordingly, the scope of the present disclosure is intended to embrace all such alternatives, modifications, and variations that fall within the scope of the claims, together with all equivalents thereof. Therefore, the above description should not be taken as limiting.

What is claimed is:

1. A computerized method comprising:
creating, by a processor associated with an enterprise scheduling system, a user profile associated with a user, the user profile including information relating to one or more devices associated with the user and at least one work location, wherein the work location is a physical location where the user performs work associated with an organization;

determining one or more locations of the one or more devices associated with the user;

predicting a predicted work location of the user by:
  comparing the location of the one or more devices with previously documented work locations, and
  optimizing, by the processor associated with the enterprise scheduling system, resources based on the predicted work location of the user and predicted work locations of other users;

in response to determining that one or more of the resources at the predicted work location are insufficient, recommending, to the user, an alternative work location; and sending, to one or more devices associated with the user, a security token that provides the user with access to the alternative work location.

2. The computerized method of claim 1, further comprising:
detecting an actual work location of the user; and
associating, by the enterprise scheduling system, the actual work location of the user with a work schedule.

3. The computerized method of claim 2, wherein predicting the predicted work location of the user is further based on the work schedule.

4. The computerized method of claim 1, wherein optimizing the resources includes adjusting at least one of network bandwidth, staffing, or temperature at an enterprise location.

5. The computerized method of claim 1, wherein the one or more devices is communicably coupled to a vehicle, wherein data from the one of the one or more devices includes a location of the vehicle, destination of the vehicle, and state of the vehicle.

6. The computerized method of claim 1, wherein data from the one or more devices includes network information, global positioning system information, cell phone triangulation information, weather information, and traffic conditions.

7. The computerized method of claim 1, further comprising:
updating accesses at the predicted work location to provide the user with access to the predicted work location.

8. The computerized method of claim 1, further comprising:
determining an actual work location based at least in part on the location of the one or more devices; and
updating a status of the user.

9. The computerized method of claim 1, wherein the one or more devices that receives the security token is different from the one or more devices used to predict the work location.

10. A non-transitory machine-readable medium having machine executable instructions stored thereon that, when executed by one or more processors, direct the one or more processors to perform operations comprising:
creating a user profile associated with a user, the user profile including information relating to one or more devices associated with the user and at least one work location, wherein the work location is a physical location where the user performs work associated with an organization;

determining a location of the one or more devices associated with the user;

predicting a predicted work location of the user by:
  comparing the location of the one or more devices with previously documented work locations, and
  optimizing resources based on the predicted work location of the user and predicted work locations of other users;

in response to determining that one or more of the resources at the predicted work location are insufficient, recommending, to the user, an alternative work location; and sending, to one or more devices associated with the user, a security token that provides the user with access to the alternative work location.

11. The non-transitory machine-readable medium of claim 10, wherein the operations further comprise:
detecting an actual work location of the user; and
associating the actual work location of the user with a work schedule, wherein predicting the predicted work location of the user is further based on the work schedule.

12. The non-transitory machine-readable medium of claim 10, wherein optimizing the resources includes adjusting at least one of network bandwidth, staffing, or temperature at an enterprise location.

13. The non-transitory machine-readable medium of claim 10, wherein the one or more devices is communicably coupled to a vehicle, wherein data from the one or more devices used to determine the location of the one or more devices includes a location of the vehicle, destination of the vehicle, and state of the vehicle.

14. The non-transitory machine-readable medium of claim 10, wherein data from the one or more devices used to determine the location of the one or more devices includes network information, global positioning system information, cell phone triangulation information, weather information, and traffic conditions.

15. The non-transitory machine-readable medium of claim 10, wherein the operations further comprise:
updating accesses at the predicted work location to provide the user with access to the predicted work location.

16. The non-transitory machine-readable medium of claim 10, wherein the operations further comprise:
determining an actual work location based at least in part on the location of the one or more devices; and
updating a status of the user.

17. The non-transitory machine-readable medium of claim 10, wherein the one or more devices that receives the security token is different from the one or more devices used to predict the work location.

18. An enterprise scheduling platform, comprising:
one or more processors; and
a computer readable storage medium having instructions stored thereon, which when executed by the one or more processors cause the enterprise scheduling platform to:
  create a user profile associated with a user, the user profile including information relating to one or more devices associated with the user and at least one work location, wherein the work location is a physical location where the user performs work associated with an organization;
  determine a location of the one or more devices associated with the user;

predict a predicted work location of the user by:
- comparing the location of the one or more devices with previously documented work locations, and
- optimizing resources based on the predicted work location of the user and predicted work locations of other users;

in response to determining that one or more of the resources at the predicted work location are insufficient, recommend, to the user, an alternative work location; and send, to the one or more devices associated with the user, a security token that provides the user with access to the alternative work location.

19. The enterprise scheduling platform of claim 18, wherein the one or more devices that receives the security token is different from the one or more devices used to predict the work location.

20. The enterprise scheduling platform of claim 18, wherein the instructions, when executed by the one or more processors further cause the enterprise scheduling platform to:
- detect an actual work location of the user; and
- associate the actual work location of the user with a work schedule, wherein predicting the predicted work location of the user is further based on the work schedule.

* * * * *